Sept. 22, 1942.  W. G. BECKERS  2,296,761
CONTAINER FOR MEDICAMENT SUBSTANCE OR THE LIKE
Filed Dec. 29, 1939
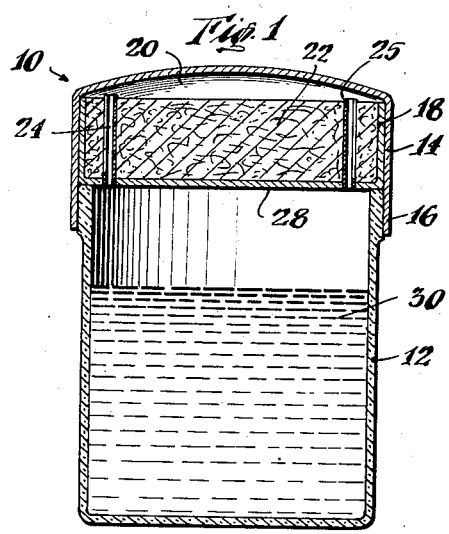
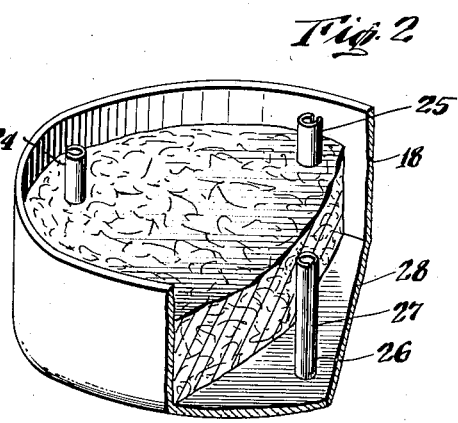
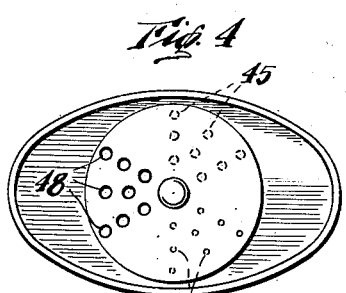
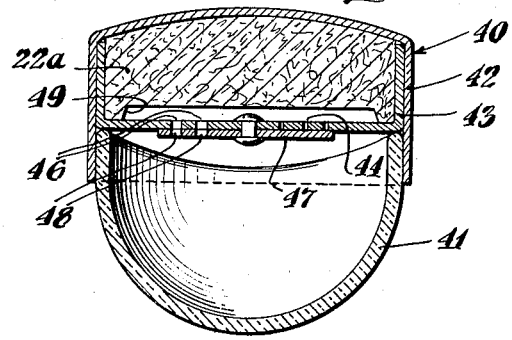
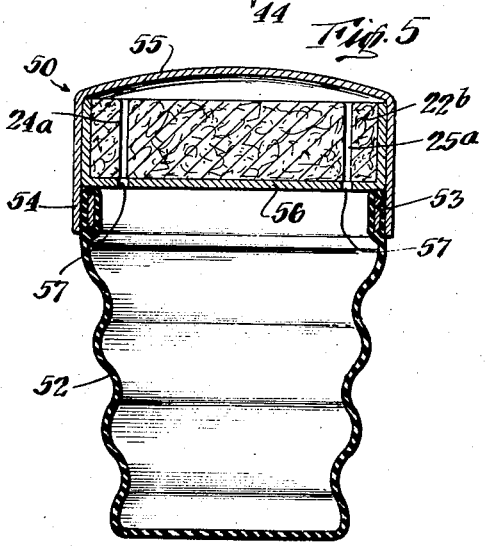
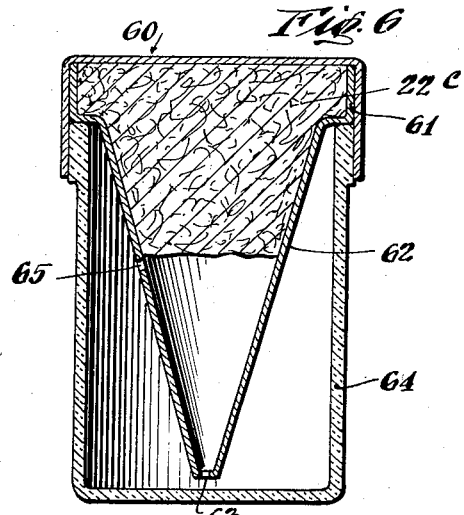
INVENTOR
William G. Beckers
BY
August, Mearn Campbell
ATTORNEYS Patented Sept. 22, 1942

2,296,761

UNITED STATES PATENT OFFICE 2,296,761

CONTAINER FOR MEDICAMENT SUBSTANCE OR THE LIKE

William G. Beckers, Bolton, N. Y.

Application December 29, 1939, Serial No. 311,498

1 Claim. (Cl. 128—272)

My invention relates to a device by which medicament or other desired solutions may be prepared from a concentrated substance for immediate external or internal use, as the case may be.

It has been customary heretofore to provide solutions for antiseptic, cleaning and other purposes in ready-to-use form. These comprise such solutions as mouth wash or gargle, eye wash, antiseptic treatment for sores, cuts, etc., dentifrice solution, fruit extracts, and the like, to mention but a few. These ready-to-use solutions in most instances comprise a high percentage of water with but a small portion of ingredients. The bulkiness of ready-to-use solutions adds to the price the consumer pays, because of the cost of necessary containers and the cost of handling, packaging and shipping such containers. Furthermore, containers sold with any appreciable quantity of the ready-to-use solutions, being of bulky size, are inconvenient to carry, and in the case of comfort kits, occupy an undesirably large space within the kit.

Bearing in mind the disadvantages of such ready-to-use solutions, one of the objects of my invention is to provide a unit which is relatively inexpensive and contains a predetermined supply of concentrated ingredients which, with the addition of water or other solvent, is capable of providing a quantity of solution of many times the space occupied by the unit.

Another object of my invention is the provision of a container for concentrated substance adapted to be brought into such association with a receptacle for the preparation of a desired solution that a regulated amount of the concentrated substance is dissolved in water or other liquid solvent without rendering the remainder of concentrated substance in the container unusable.

It is a further object of my invention to provide a container of concentrated substance with means for controlling the rate or degree of dissolution of the substance contained therein.

A still further object of my invention is the provision of a container for a supply of concentrated substance adapted to be brought into association with and serve as a cover for a receptacle of desired shape and size in which liquid may be placed and brought into contact with medicament or other substances during an inverting movement of the receptacle.

I accomplish the above objects and features of the invention by providing a device with a compartment in which the desired concentrated substance or a composition including the desired ingredients is placed, either in granular or cake form or as a felt or porous substance impregnated with the desired ingredients. The device is also provided with means to determine the effective cross-sectional area of the communicating passages through which water or other solvent may pass for contact with the prepared substance.

The means for controlling the communication to the space containing the prepared substance may take any desired form whereby a desired amount of liquid is brought or permitted to come into contact with the substance. For example, the device may be provided with tubular elements extended through a wall of the device to a space adjacent the substance, the tubes being provided with side openings to facilitate drainage; or groups of openings may be provided in various sizes associated with means adapted to selectively expose the different groups; or means may be provided forming a communication passage or passages to the interior of the device leading to a space provided adjacent the top or bottom side of the concentrated substance. As the description proceeds, many other possible forms will become apparent.

The device is particularly adapted for use as a cover for a small receptacle to be normally associated therewith, the receptacle being of any desired size or shape adapted for special usage or even collapsible where storage and carrying space is of importance.

Additional objects and features of my invention will become further apparent upon consideration of the following detailed description, when taken in connection with the accompanying drawing, in which:

Fig. 1 is a view in vertical section of one form of the invention showing the concentrate container in the form of a cover in association with a receptacle;

Fig. 2 is a perspective view of the concentrate container with parts broken away to show the detailed construction thereof;

Fig. 3 is a view in vertical section of another form of the invention associated with an eye glass receptacle;

Fig. 4 is a bottom plan view of the cover shown in Fig. 3;

Fig. 5 is a view in vertical section of another form of my invention associated with a collapsible receptacle; and Fig. 6 is a view in vertical section of a further form of concentrate container.

Referring to the drawing, the form of my invention illustrated in Figs. 1 and 2 comprises a concentrate container 10 and a small receptacle 12 with which the container is associated as a cover. The container 10 is provided with an outer cup-shaped housing member 14 which has an extension 16 adapted to overlap and closely engage the rim of the receptacle 12 to provide a substantially tight seal therewith. An inner cup-shaped member 18 is tightly held in telescoped relation with the portion 16 to provide a compartment 20 in which any desired ingredients 22 may be contained either in granular or cake form or as a felt or porous material impregnated with concentrated substance. To provide a space adjacent the concentrated substance 22, the outer member 14 is slightly bulged at the top, as shown in Fig. 1. The inner cup-shaped member 18 is provided with a plurality of tubular elements 24, 25 and 26, each of which are provided with a narrow slot 27 along the length thereof to a point adjacent the bottom wall 28 of the member 18 through which the tubes extend. The tubes 24 communicate with the interior of the receptacle 12 which normally provides a substantially tight seal for the unit at 16.

The capacity of the receptacle 12, of course, depends upon the character of ingredients and the use for which the solution is intended, the receptacle being of a size to provide sufficient solution for one helping. In the case of a gargle or mouth wash, for example, the receptacle is preferably in the neighborhood of one or two ounces. When a solution is desired, water or other solvent 30 is placed in the receptacle, the cover 10 placed thereon and the receptacle inverted momentarily one or more times depending on the strength of solution desired. An inversion of the receptacle provides for the flow of liquid through the tube to the space adjacent the concentrated substance. A small portion of the liquid is brought into contact with a predetermined area of the concentrated substance each time the receptacle is inverted, thus determining the rate of dissolution of the substance for each inversion of the receptacle. The liquid after coming in contact with the substance is drained back through the tubes when the receptacle is returned to an upright position, the slots 27 being provided to insure proper drainage as the prepared substance is gradually dissolved by successive usage of the unit.

Any desired shape or size of receptacle may be provided with the cover containing the prepared substance. For example, the receptacle may take the form of an eye glass or any other desired shape depending, of course, upon the particular use for which the concentrated substance is intended.

In this connection, I wish to call attention to the fact that my invention is particularly adapted for use in the preparation of solutions for treating eyes, sores, cuts and the like, where a specially shaped receptacle, such as an eye glass, is desirable. Many medical substances, such as boric acid, are water repellent and therefore difficult and inconvenient to dissolve into solutions where small amounts are required. This inconvenience is overcome by providing a container of my invention with a supply of medical ingredients, such as boric acid, or a composition containing boric acid from which small quantities of desired solution may be quickly and easily prepared in an eye glass or other suitably shaped receptacle for immediate application.

The form of my invention illustrated in Figs. 3 and 4 shows a cover member 40 associated with a receptacle 41 in the shape of an eye glass. The eye glass or receptacle 41 is shown to have a rounded bottom surface to minimize on the space required for packaging or carrying the unit. The cover member 40 is similar to the form shown in Figs. 1 and 2 in that it comprises a pair of telescoped cup-shaped members 42 and 43. The container, however, may be otherwise constructed, if desired. The bottom wall of the member 43 is provided with three groups of openings 44, 45 and 46, the openings of each group varying in size from the openings of the other group. For example, the openings 44 are of minimum size, while the openings 46 are of a predetermined maximum size and the openings 45 are of an intermediate size. These openings are controlled by a pivoted plate 47 which contains openings 48 of a size corresponding to the large openings 46. Thus by pivotally moving the plate 47, the openings 44, 45 and 46 may be selectively exposed to the receptacle 41.

The medical composition or concentrated substance 22a is preferably provided with a recessed portion 49 adjacent the communicating openings of the member 43. This recess provides for the contact of liquid with substantially equal areas of substance until the substance is practically all dissolved. The user is thus able to regulate with reasonable certainty the strength of the solution desired by determining the size of openings exposed and the number of times the unit is inverted.

It is to be understood, however, that the eye glass or any other receptacle of different shape and size may be used not only with the form of container illustrated in Figs. 3 and 4, but also with those forms illustrated in Figs. 1, 2, 5 and 6.

The unit illustrated in Fig. 5 comprises a container 50 which is shown associated with a collapsible receptacle 52. The receptacle 52 is provided with a stiff rim 53 which is adapted to closely engage the lower portion 54 of the container 50 to form therewith a substantially tight seal. The collapsible receptacle 52 is shown to have a frusto-conical shape whereby the body portion thereof is adapted to be collapsed within the portion 54 to provide a compact unit of miniature proportions. It is to be understood, however, that the collapsible receptacle illustrated with the form in Fig. 5 may take any desired shape and be used with any other form of concentrate container.

The container 50 comprises outer and inner cup-shaped members 55 and 56 telescopically associated to provide a chamber in which a concentrated substance 22b is contained. In this form of the invention the tubular elements of the form illustrated in Figs. 1 and 2 are replaced by passages such as 24a and 25a extended through the concentrated substance to the top surface thereof. These passages coincide with openings 57 provided in the bottom wall of the inner member 56.

During use of the form illustrated in Fig. 5, the dissolution of the concentrated substance may tend to increase the size of the passages thereby gradually increasing the contact area of the substance so that the strength of the solutions may tend to gradually increase per inversion as the substance is dissolved. The tendency of the strength of solution to change may, however, be controlled by varying the number of inversions of the unit during preparation of the desired solution.

A further form of concentrate container for use as a cover for a receptacle is shown in Fig. 6. The inner member 61 of the container 60 is provided with a bottom wall shaped to include a depending tapered section 62 having a communicating opening 63 at or adjacent the apex thereof and an air vent 65 through the side just below the bottom surface of the substance contained therein. The section 62 may be of any desired shape, either conical, pyramidal, or even rectangular or cylindrical, so long as the section provides an elongated passage with a communicating opening 63 slightly spaced from the bottom of the receptacle 64. The opening 63 may be of any shape or size desired or may comprise a plurality of small openings. The cake of concentrated substance 22c may be flat sided or in a form similar to the shape of the compartment including a portion of the tapered section 62.

When it is desired to prepare a solution from the substance contained in a unit having the form illustrated in Fig. 6, the cover 60 is removed and the desired amount of liquid placed in the receptacle 64. The cover is then replaced upon the receptacle immersing the section 62, the amount immersed depending, of course, upon the amount of liquid placed in the receptacle. The immersion of the section 62 causes air contained therein to be vented through the opening 65 as liquid enters through the lower opening 63. It will thus be apparent that the amount of liquid which enters the extension is substantially in proportion to the amount of liquid contained in the receptacle. This insures substantially the same strength of solution for different quantities of liquid for each inversion of the unit.

When the unit of Fig. 6 is inverted, practically only that liquid which already has entered the section 62 is brought into contact with the concentrated substance 22c. Stronger solutions, when desired, are obtained by inverting the unit two or more times. After a desired number of inversions, the cover is lifted from the receptacle permitting the liquid contained therein to drain into the receptacle. The tapered feature of this form of the invention is found to greatly facilitate the draining of liquid from the cover while the cover is being lifted from the receptacle. It should also be recognized that by extending the substance 22c into the tapered extension a larger compartment is thereby provided for the substance.

From the foregoing it should be apparent that my invention is particularly adapted to make solutions of such strength as to suit individual tastes and special requirements, as the case may be. It is also adapted to units of miniature or pocket size. A unit of small size may be carried in one's pocket or in a compact kit without utilizing much space. The receptacle may be used for rinsing after using the solution and also as an individual drinking cup.

While I have shown several embodiments of my invention, it is to be understood that I am aware that many other variations of the invention are possible. It is to be understood, therefore, that the forms I have shown and described are intended to be illustrative only and not to restrict the scope of the appended claim.

I claim:

A container for a concentrated substance comprising a housing having a compartment for containing a body of the substance, a wall of the compartment being formed to provide a space adjacent a surface of the substance, the opposed wall of the compartment being provided with openings, tubular elements extended through said openings and through the body of said substance to said space, and said tubular elements each being provided with a narrow slot along the length thereof to a point adjacent said opposed wall.

WILLIAM G. BECKERS.